Nov. 1, 1932.  B. NELL  1,886,275

METHOD OF JOINING PIPE ENDS

Filed March 31, 1930

Inventor:
B. Nell

Patented Nov. 1, 1932

1,886,275

UNITED STATES PATENT OFFICE

BERNHARDT NELL, OF DUSSELDORF, GERMANY, ASSIGNOR TO THE FIRM VEREINIGTE STAHLWERKE AKTIENGESELLSCHAFT, OF DUSSELDORF, GERMANY

METHOD OF JOINING PIPE ENDS

Application filed March 31, 1930, Serial No. 440,491, and in Germany May 2, 1925.

In the production of joints between seamless and welded pipes, it is of great importance to render the junction resistant to axial thrust and bending stresses.

It is the object of the present invention to provide a pipe joint which not only is of exceptional strength but also offers great advantages in connection with certain kinds of uses, for example the mining industry.

According to the invention, the joint is made in such a way that the one pipe is thickened at its end, the thickened or enlarged end having the shape of two cones arranged base to base, while the other pipe is widened out or flared and slid on the thickened pipe end. The flaring is carried to such an extent that the point where the enlargement begins will bear snugly against the surface of the thickened pipe end. After the pipes have been inserted, one into the other, the projecting end of the flared pipe will be upset in such a way as to fit as closely as possible the inner pipe. At last a welding seam is made at a suitable point directly on the enlargement.

This type of joint has the advantage of an extraordinarily high resistance to breakage and leakage so as to be particularly well suited for example for use in mining districts where earth movements are liable to occur. This strength, first of all, depends upon the thickening of one of the pipe ends together with the pressure action which is applied to the enlargement by the flared pipe end after the upsetting operation as well as the contraction which occurs due to cooling. Furthermore, since the joint is reinforced also at the point of the weld, the welding flame cannot cause any undesired weakening of the material.

It will prove particularly advantageous with the pipe joint according to the invention, to so produce the thickened part of the pipe end that the internal diameter thereof remains unaltered. Thus, the formation of water traps, otherwise liable to occur, will be successfully prevented.

In the accompanying drawing wherein an approved embodiment of the invention is illustrated:

Figure 1:
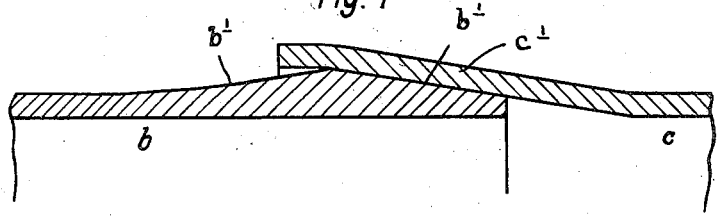
Fig. 1 is a fragmentary longitudinal section through two pipe ends showing the improved joint.
Figure 1A:
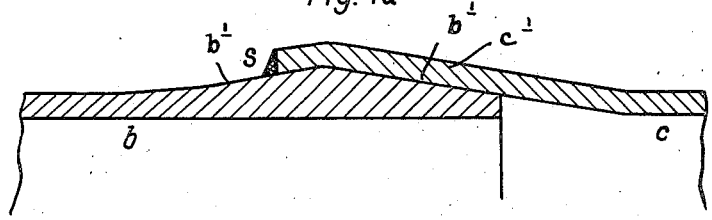
Fig. 1a is a similar view showing the completed pipe joint.

Referring in detail to Figs. 1 and 1a, $b$ indicates the inner pipe end which is provided with an external enlargement substantially corresponding in shape to two conical members arranged base to base, the two oppositely inclined surfaces of the enlargement being designated at $b'$. The outer pipe end $c$ is provided with a terminal flare $c'$ of such size and shape as to snugly fit the outermost conical surface $b'$ of the inner pipe end. The two pipe ends are slipped together as shown in Fig. 1 and thereafter the extreme end of the outer pipe $c$ is turned inwardly over the inwardly tapering surface $b'$ and finally the edge of the outer pipe is welded at $s$ directly to the enlargement of the inner pipe, thereby forming a strong and leak-proof joint.

Figure 2:
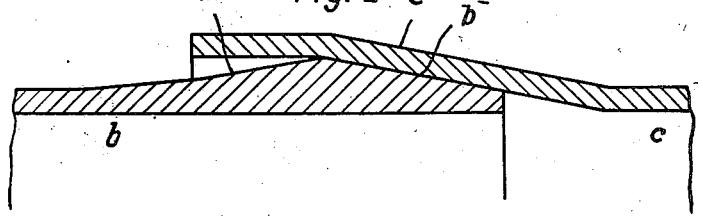
Figs. 2 and 2a are views identical with Figs. 1 and 1a but showing the outer pipe end removed a somewhat greater distance inwardly over the inner pipe end.
Figure 2A:
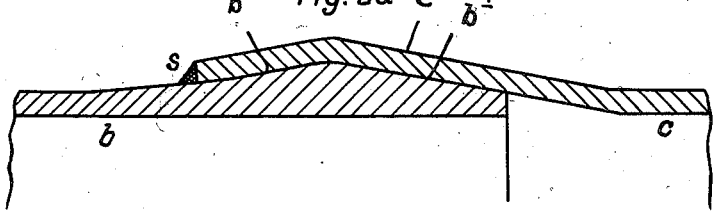

The arrangement shown in Figs. 2 and 2a differs from that shown in Fig. 1a in that the flare $c'$ of the outer pipe is of greater size and may therefore pass for a greater distance over the enlargement of the inner pipe. As in the first described instance, the extreme end of the outer pipe is turned inwardly and welded at $s$ directly to the enlargement of the inner pipe.

Having thus described my invention what I claim as new and desire to secure by Letters Patent is:

A pipe joint comprising inner and outer pipes, an exterior enlargement on the end portion of the inner pipe presenting two conical surfaces arranged base to base, the outer pipe being positioned over the enlargement of the inner pipe and bearing tightly against both conical surfaces of the enlargement, the edge of the outer pipe end being welded directly to the enlargement of the inner pipe.

BERNHARDT NELL.